United States Patent [19]
Brophy et al.

[11] Patent Number: 5,129,724
[45] Date of Patent: Jul. 14, 1992

[54] APPARATUS AND METHOD FOR SIMULTANEOUS MEASUREMENT OF FILM THICKNESS AND SURFACE HEIGHT VARIATION FOR FILM-SUBSTRATE SAMPLE

[75] Inventors: Chris P. Brophy, White Bear Township; Ramsey County, Minn.; James D. Ayres; Donald K. Cohen, both of Tucson, Ariz.

[73] Assignee: Wyko Corporation, Tucson, Ariz.

[21] Appl. No.: 647,555

[22] Filed: Jan. 29, 1991

[51] Int. Cl.$^5$ ............................................. G01B 11/02
[52] U.S. Cl. ..................................... 356/357; 356/360
[58] Field of Search ............... 356/357, 359, 360, 432; 250/560

[56] References Cited

U.S. PATENT DOCUMENTS

| | | | |
|---|---|---|---|
| 3,824,017 | 7/1974 | Galyon | 356/108 |
| 4,514,083 | 4/1985 | Fukuoka | 356/1 |
| 4,611,919 | 9/1986 | Brooke, Jr. et al. | 356/357 |
| 4,826,321 | 5/1989 | Coates et al. | 356/351 |
| 4,832,489 | 5/1989 | Wyant et al. | 356/359 |
| 4,834,539 | 5/1989 | Le Bris et al. | 356/369 |
| 4,850,711 | 7/1989 | Sano et al. | 356/382 |
| 4,908,508 | 4/1990 | Dubbeldam | 250/225 |
| 4,957,367 | 9/1990 | Dulman | 356/359 |

FOREIGN PATENT DOCUMENTS

WO87/04237 7/1987 Fed. Rep. of Germany.
62-261044 11/1987 Japan.

OTHER PUBLICATIONS

"Determination of depth of layer separation in dielectric materials in which set frequency electromagnet wave is passed onto material, with changing ellipticity of reflected wave noted", 1987 Derwent Publications Ltd., SU-1264052 A-1.

"Internal reflection ellipsometry for metal deposits", E. C. Chan, University of Western Ontario, London, Ontario, Canada and J. P. Marton, Welwyn Canada Limited, London, Ontario, Canada, Paper No. S2857 0049, Oct. 1972.

"Limitations and Corrections of Optical Profilometry in Surface Characterization of Carbon Coated Magnetic Recording Disks", Li & Talke, Center for Magnetic Recording Research, University of Calif., San Diego, CMRR Preprint Series.

(List continued on next page.)

*Primary Examiner*—Samuel A. Turner
*Assistant Examiner*—LaCharles P. Keesee
*Attorney, Agent, or Firm*—Cahill, Sutton & Thomas

[57] ABSTRACT

The relative height variation and the thickness of a film of an object are simultaneously measured. A first interference pattern is produced for a calibration surface at a first wavelength and detected. Intensities of the first interference pattern are measured and used to compute a first group of phase values for each pixel. Intensity values of a point of the calibration samples are measured and used to compute a corresponding phase. A second interference pattern for the calibration surface is produced at a second wavelength and detected. Intensities of the second interference pattern are measured and used to compute a second group of phase values for each pixel. Intensity values of the point of the calibration surface are measured and used to compute a corresponding phase. A value for the surface height change $\Delta h$ is computed by obtaining a linear combination of the corresponding phase values of the data groups. A drift value is computer by obtaining the difference between the first and second phase values at the point. A corrected surface height change value is computed for the calibration sample by adding the two. This procedure is repeated for a test surface to obtain its corrected surface height change. A corrected relative surface height change value $\therefore h'$ is computed by subtracting the corrected surface height change value of the calibration surface from the corrected surface height change value for the test surface for each pixel. Computed $\Delta h'$ values are compared to corresponding values from a mathematical model to obtain a best fit value of film thickness $t$ for each pixel and the height error due to phase change is subtracted.

42 Claims, 5 Drawing Sheets

OTHER PUBLICATIONS

"Signal & Noise in magneto-optical readout", Masud Mansuripur and G. A. N. Connell, 4485, J. Appl. Phys. 53(6), Jun. 1982, 0021-8979/82/064485-10$02.40.

"The Ellipsometer, an Apparatus to Measure Thicknesses of Thin Surface Films", Alexandre Rothen, The Review of Scientific Instruments, vol. 16, No. 2, Feb. 1945, p. 26.

"An Experimental Study of the Change in Phase Accompanying Reflection of Light from Thin Evaporated Films", Schulz & Scheibner, Journal of the Optical Society of America, vol. 40, No. 11, Nov. 1950 Date Considered.

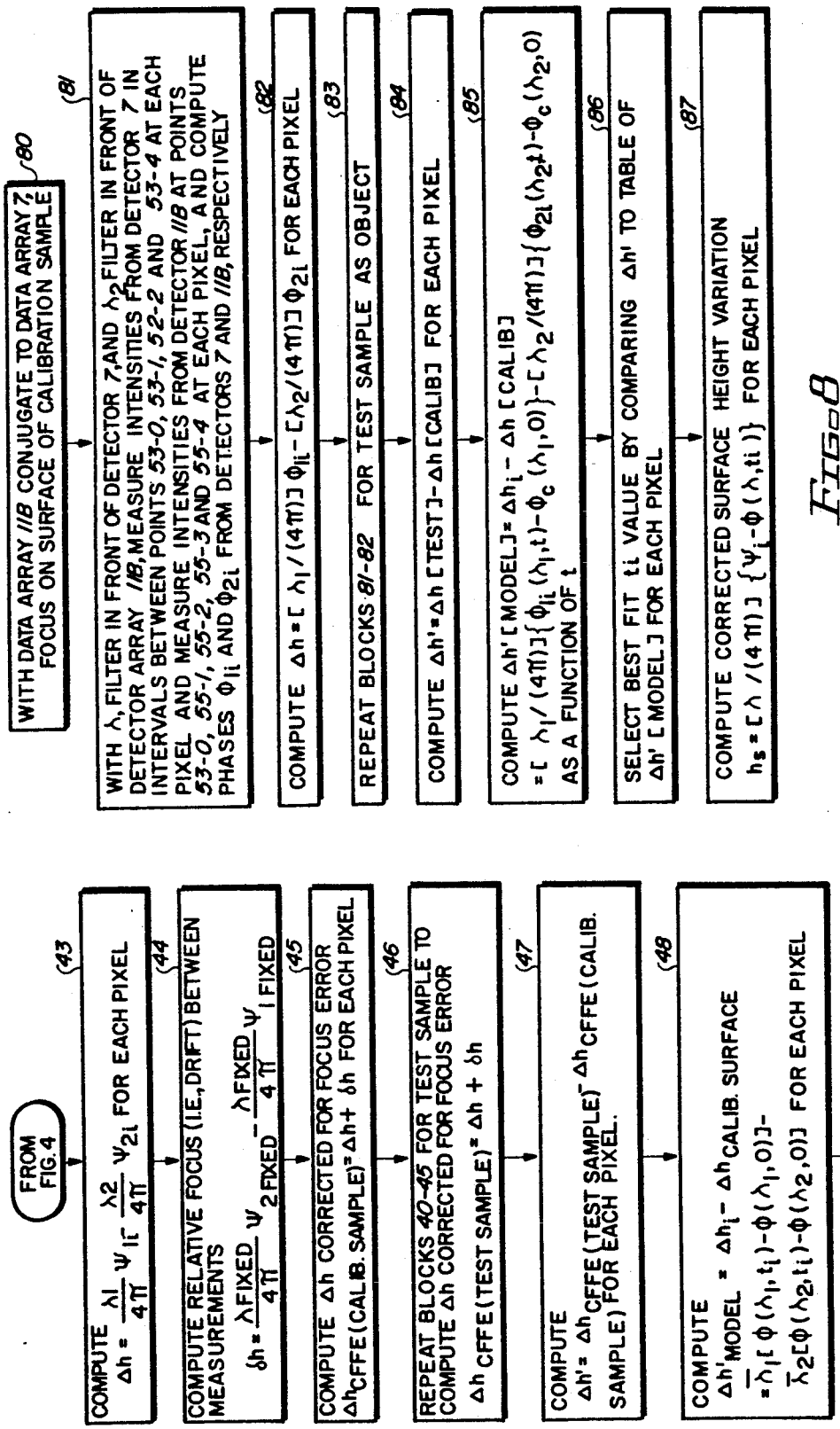

5,129,724

APPARATUS AND METHOD FOR SIMULTANEOUS MEASUREMENT OF FILM THICKNESS AND SURFACE HEIGHT VARIATION FOR FILM-SUBSTRATE SAMPLE

BACKGROUND OF THE INVENTION

The invention relates to techniques for simultaneously profiling both surface height variation and film thickness of a film on a substrate using phase shifting interferometry techniques.

Although optical profilers have the advantage of being noncontact instruments, they have the drawback that they record errors in height variation across boundaries of different materials if the "optical phase change on reflection" varies across such boundaries. This is in contrast to contact profilers, which have no such drawback. For test samples having areas covered by transparent films, the recorded height error is a function of film thickness, which can vary from point to point independently from the surface height variation.

There are many instances in which it is desirable to use interferometric techniques to measure the thickness of a film 3 formed on a substrate 2, as shown in FIG. 1, and simultaneously obtain the "interfacial surface profile", i.e., the profile of the interface surface 3A between the film 3 and the substrate 2 of a test sample. The closest known prior art techniques involve use of "ellipsometry", which can be used to obtain the thickness of the film. However, ellipsometry cannot be used to obtain the interfacial surface profile or outer surface profile of the test sample. Other drawbacks of ellipsometry applied to the present subject include the necessity for a very oblique angle of incidence of a test beam and a generally large sampling spot size.

It is known that when interfering beams of white light are projected onto film 3 on substrate 2, a superposition of monochromatic interference patterns is formed. Each monochromatic interference pattern is affected by the sample differently due to the wavelength-dependent phase change incurred in the light as it traverses the film. Each monochromatic interference pattern also is affected by the sample differently due to wavelength-dependent phase changes that can occur as a result of reflection at the outer surface of the film and the interface between the substrate and the film. By selecting or filtering an appropriate set of these monochromatic interference patterns from the underlying white light pattern, it is possible to transform the phases to obtain the film thickness and the interface height by means of the well-known Fresnel reflection equations.

At a conference in October, 1989 Li and Talke suggested using the difference of two independent height measurements taken at different wavelengths to eliminate surface height variation and produce a weighted difference of the phase changes on reflection at the two wavelengths. Film thickness then could be derived from this quantity. (Two-wavelength interferometric techniques are known (See commonly assigned U.S. Pat. No. 4,832,489, issued May 23, 1989 to Wyant et al.), but do not solve the above-mentioned problems for surfaces caused by transparent films or errors in height variation due to optical phase change on reflection.) However, since the data for the two wavelengths are taken at different times, it is possible for errors to arise because of slight changes in the physical location of the upper surface of film 3. The most likely source of such errors is referred to as "drift", and is due, for example, to vibration of the substrate relative to the interferometer reference surface or temperature changes in the apparatus supporting the film-substrate sample 2,3. Even minute drift errors of as little as one nanometer are significant in some applications. In addition, influences of phase changes from the reference optics and beamsplitter optics must be eliminated by a calibration step prior to measurements of test samples. However, Li and Talke suggest no specific implementation of this idea or of avoiding the effects of drift errors or the influences of phase changes from optics other than the test sample.

The problem to be solved by the present invention is how to eliminate these effects.

SUMMARY OF THE INVENTION

Accordingly, it is an object of the invention to eliminate the effects of drift errors and undesirable phase changes that occur due to undesirable motion, temperature changes, and unknown film composition in the interferometer supporting a film-substrate test sample, and thereby make it possible and practical to simultaneously measure film thickness and surface height variations.

Briefly described, and in accordance with one embodiment thereof, the invention provides a technique for simultaneously measuring both the relative height variation and the thickness of a film of an object that includes the film on a substrate. A first interference pattern is produced between a test beam reflected from a calibration surface and a reference beam reflected from a reference surface of an interferometer operating at a first wavelength $\lambda_1$. The calibration surface should be a simple substrate with known phase change on reflection, e.g., a dielectric such as glass. The first interference pattern is detected with a detector array. A plurality of intensities of the first interference pattern are measured and used to compute a first group of phase values corresponding to the first wavelength for each pixel of the detector array in accordance with a preselected phase shifting algorithm. A plurality of intensity values corresponding to a point, referred to, hence, as a conjugate point, at an alternate image plane of the surface that is illuminated by the underlying white light interference pattern, which optionally can be independently filtered at a wavelength $\lambda_{FIXED}$, of the surface of the calibration surface is measured and used to compute a corresponding phase value in accordance with the preselected phase shifting algorithm. A second interference pattern is produced between a test beam reflected from the calibration surface and a reference beam reflected from the reference surface of the interferometer operating at a second wavelength $\lambda_2$. The second interference pattern is detected with the detector array. Intensities of the interference pattern are measured and used to compute a second group of phase values corresponding to the second wavelength for the calibration surface for each pixel of the detector array in accordance with the phase shifting algorithm. A plurality of intensity values of a point of the surface of the calibration surface illuminated by the underlying white light, or white light independently filtered at a wavelength $\lambda_{FIXED}$, are measured and used to compute a corresponding phase value in accordance with the preselected phase shifting algorithm. A value for the surface height change $\Delta h$ is computed by effectively obtaining a weighted difference between the corresponding phase values of the $\lambda_1$ and $\lambda_2$ data groups for each pixel. A drift value $\delta h$ is computed by obtaining a value proportional to the difference between the first and second phase values at the conjugate point, sampling the white light or the independently filtered white light. A corrected surface height change value $\Delta h_{CFFE}$(CALIB SAMPLE) is computed for the calibration sample by adding the value of the surface height change to the drift for the calibration sample. This procedure is repeated for a test surface instead of the calibration surface to obtain a corrected surface height change value $\Delta h_{CFFE}$(TEST SAMPLE). A corrected relative surface height change value $\Delta h'$ is computed by subtracting the corrected surface height change value for the calibration surface from the corrected surface height change value for the test surface for each pixel. A table of values $\Delta h'_{MODEL}$ are computed as a function of film thickness. Computed $\Delta h'$ values are compared to corresponding $\Delta h'_{MODEL}$ values from the table to obtain a best fit value of film thickness t for each pixel. Relative surface height of the test sample then is computed by selecting either of the initial $\lambda_1$ or $\lambda_2$ data and subtracting the height error due to phase change error associated with the obtained film thickness t.

BRIEF DESCRIPTION OF THE DRAWINGS

FIGS. 4 and 4A–4B constitute a flowchart useful in explaining a technique for obtaining film thickness and surface profiles of a film-on-substrate test sample using the embodiment of FIG. 1.

FIG. 8 is a flowchart useful in describing the operation of the embodiment of FIG. 7.

DETAILED DESCRIPTION OF THE PREFERRED EMBODIMENTS

Figure 1:
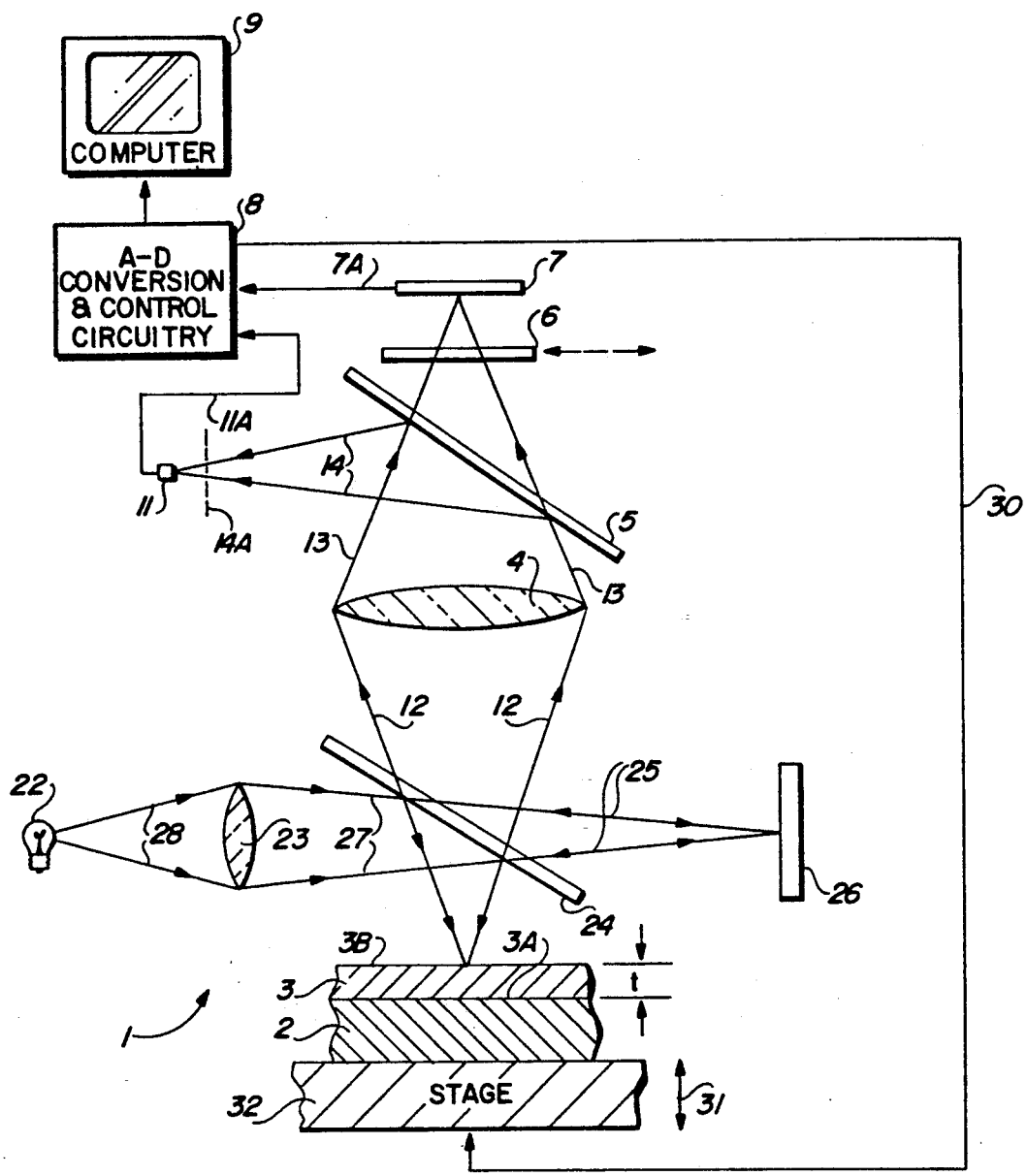
FIG. 1 is a schematic diagram of one embodiment of the invention.

Referring to FIG. 1, system 1 includes a test sample including substrate 2 and film 3 on substrate 2. Numeral 3A designates the interfacial surface between film 3 and substrate 2. Numeral 3B designates the upper surface of test sample 2,3. Film 3 must be transparent or semi-transparent. An interferometer illuminated by broadband light source 22 produces a beam 28 that is focused by lens 23 to produce beam 27, part of which passes through beamsplitter 24 to reference surface 26 of the interferometer. The other portion of beam 27 is reflected downward onto surface 3B of film/substrate sample 2,3, as illustrated.

A beam 12 is reflected by the film/substrate sample 2,3 back through beamsplitter 24 to lens 4 and is focused thereby as beam 13 through beamsplitter 5 and filter 6 onto a detector array 7. Conductor 7A coupled to detector array 7 is received by an analog-to-digital conversion and control circuit 8 that controls read-out of the detector array in a conventional manner. The digital output produced by circuit 8 to represent the intensity of the pixel presently being read is applied to computer 9, which executes a known phase shifting algorithm to compute the phase and compute the height and correct it for errors, as subsequently explained.

The beam 25 reflected from reference surface 26 is reflected upward by beamsplitter 24 and interferes with beam 12, producing an interference pattern that is detected by detector array 7 located at an image plane of both the film/substrate sample plane and the reference surface plane.

A portion of combined beam 13 is reflected by beamsplitter 5 as beam 14 onto a "point detector" 11, the analog output of which is fed via conductor 11A into analog-to-digital conversion and control circuit 8, from which a corresponding digital output is 10 sent to computer 9. An optional filter that passes light having a wavelength of $\lambda_{FIXED}$ is designated by numeral 14A. Point detector 11 is located in an image plane of the film/substrate sample 2,3, and thus is conjugate to a particular point on the data array. The conjugate point detector 11 acquires intensity data (for later phase computation) over the same time period that intensity data is acquired with the detector array 7.

The system of FIG. 1 accomplishes the previously mentioned objectives of eliminating drift errors by providing beamsplitter 5 and point detector 11 below the exchangeable filter 6.

The data received by point detector 11 is utilized to correct the errors in computing the height of the surface 3B of film 3 both at the time that data is collected by data array 7 with a filter 6 of wavelength $\lambda_1$ in place and at a later time when data is collected by detector array 7 with a filter 6 of wavelength $\lambda_2$ in place. If any drift or movement of surface 3B of film 3 has occurred, the amount of that drift error can be computed and combined with the data collected by detector array 7, so the film thickness and the profile of interfacial surface 3A computed from the $\lambda_1$ wavelength data and the $\lambda_2$ wavelength data can be adjusted for the drift error.

Figure 2:
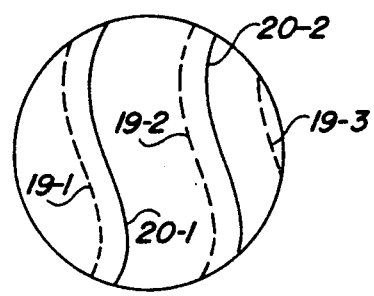
FIG. 2 is a schematic plan view of an image of a film-on-substrate sample showing interference fringes for two different wavelengths.

FIG. 2 is a view of an image of film-substrate sample 2,3 showing interference fringes indicated by solid line 20-1 and 20-2 for wavelength $\lambda_2$ and by dotted lines 19-1, 19-2, and 19-3 for wavelength $\lambda_1$.

Figure 3:
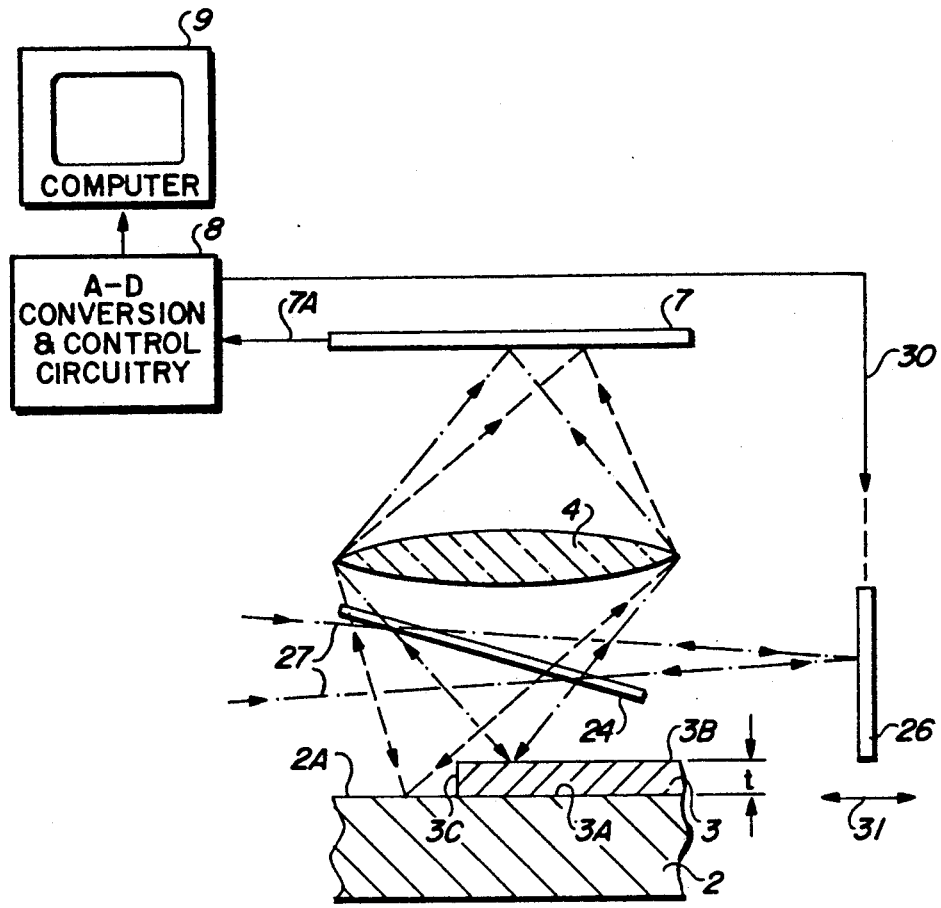
FIG. 3 is a schematic diagram of an alternate embodiment of the invention.

In accordance with another embodiment of the invention shown in FIG. 3, correction for drift on the surface of film-substrate sample 2,3 is achieved without use of beamsplitter 5 and without point detector 11. In this embodiment, a step 3C is provided in film 3, exposing part of surface 2A of substrate 2 directly to the interferometer test beam. In this embodiment, film-substrate sample 2,3 must have an exposed substrate area. As in the embodiment of FIG. 1, data is collected by detector array 7 at one time for wavelength $\lambda_1$ and at another time for wavelength $\lambda_2$. The locations of surfaces 2A and 3B may "drift" between those two times. Each time, data for the exposed surface 2A of substrate 2 is included in the data for surface 3B collected by detector array 7. Any thermal or vibrational drift causes exposed substrate surface 2A to move between the $\lambda_1$ measurements and the $\lambda_2$ measurements by exactly the same amount that surface 3B moves. Consequently, the drift error can be computed from the data collected, and then can be used to correct the film thickness t and surface profile h to compensate for the effects of such drift.

The operation of system 1 of FIG. 1 now will be described with reference to the flowchart of FIGS. 4, 4A and 4B and the diagrams of FIG. 5. An initial part of the procedure is to obtain a surface profile of a "calibration sample" (not shown in FIG. 1) of known phase change, which can simply be a flat glass surface. This step is necessary to subtract the influence of unknown phase changes from optics in the interferometer other than the test sample. The initial procedure for the calibration sample is described with reference to blocks 40-45 of FIGS. 4 and 4A. The same procedure then is repeated for the test sample 2,3 shown in FIG. 1.

As indicated in block 40, the first step is to focus the image of the calibration sample onto the point detector 11. This can be achieved easily if point detector 11 also is part of an auto-focus servo mechanism so that the maximum contrast of the interference pattern produced by test beam 12 (reflected from surface 3B of film 3) interfering with reference beam 25 (reflected by reference surface 26 and beamsplitter 24) is automatically obtained on detector array 7. The path 30 from control circuitry in block 8 to sample stage 32 to produce motion indicated by arrows 31 allows servo control of the path difference in the interferometer. A known autofocus mechanism is disclosed in the assignee's U.S. Pat. No. 4,931,630, entitled "APPARATUS AND METHOD FOR AUTOMATICALLY FOCUSING AN INTERFERENCE MICROSCOPE", issued Jun. 5, 1990, incorporated herein by reference.

The total phase $\psi_{1i}$ for the ith pixel is "measured" at a first wavelength $\lambda_1$ by means of detector array 7, circuit 8, and computer 9 of FIG. 1. Points 53-0, 53-1, 53-2, 53-3, and 53-4 on sloped line 52 in FIG. 5 represent time intervals over which the intensities of each of the pixels of detector array 7 are measured, as indicated in block 41. The phase $\psi_{1i}$ then is computed from the measured intensities for each pixel in accordance with a suitable phase-shifting algorithm, as described for example in the assignee's U.S. Pat. No. 4,639,139 "OPTICAL PROFILER USING IMPROVED PHASE SHIFTING INTERFEROMETRY", by Wyant et al., issued Jan. 27, 1987, and incorporated herein by reference. Note that the slope of straight line 52 in FIG. 5 represents shifting of the relative phase between the calibration sample or test sample and the reference mirror 26 of the interferometer. The relative phase shift between the adjacent points 53-0, 53-1, 53-2, 53-3, and 53-4 is ninety degrees at wavelength $\lambda_1$, in this particular example.

Figure 4B:
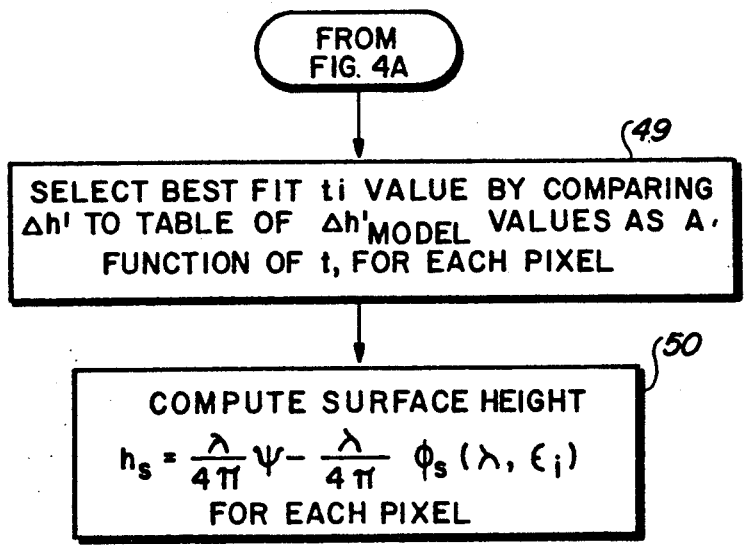
Figure 4:
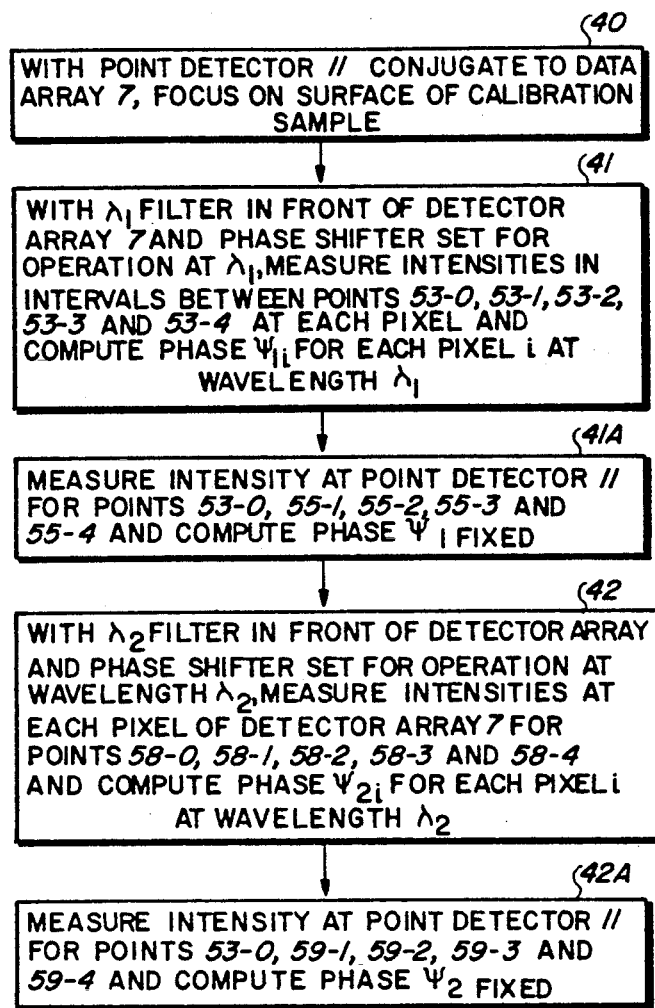
Figure 5:
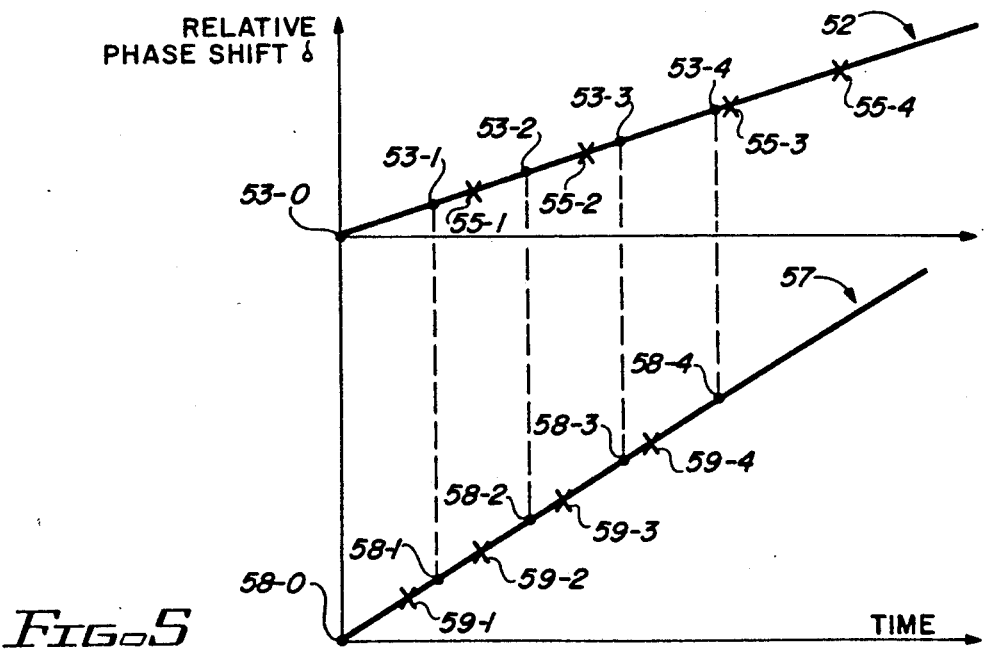
FIG. 5 discloses a pair of graphs useful in explaining the flowchart of FIG. 4.

At essentially the same time, the intensity at point detector 11 is measured at intervals determined by points 55-1, 55-2, 55-3, and 55-4 on line 52 of FIG. 5, as indicated in block 41A. (The relative phase shift between points 55-1, 55-2, 55-3, and 55-4 must be the same as the phase shift assumed for measurements of $\psi_1$ and $\psi_2$, if the same phase shifting algorithm is used.) The interval chosen for the point detector measurements determines an effective wavelength $\lambda_{FIXED}$ for the point detector phases. $\lambda_{FIXED}$ should be chosen to lie in the middle part of the white light spectrum. These intensities are used to compute the phase $\psi_{1FIXED}$ at wavelength $\lambda_{FIXED}$, as also indicated in block 41A of FIG. 4. If a $\lambda_{FIXED}$ filter 14A is not used, then $\lambda_{FIXED}$ is determined by the way in which the phase shift at which intensity data is sampled by point detector 11 is selected. Since point detector 11 sees a broad band of wavelengths on the point which it sees of test surface 3B, the one of those wavelengths at which point detector 11 accomplishes its sampling is determined by the phase shift interval between intensity measurements in the series that defines a single phase measurement. Using well-known continuous phase shifting mechanisms, it is possible to select a phase-shift interval for the data acquisition of the point detector to be different from the phase-shift interval for the data acquisition of the data array, over the same time of measurement for the series of intensities (of FIG. 5). A simple scaling of the phase shift interval for the point detector relative to the phase-shift interval for the data array makes it possible to, within limits, arbitrarily select the appropriate value for $\lambda_{FIXED}$, the effective wavelength of the phase measurement from the point detector when illuminated by broadband light. It is most convenient to scale the phase-shift interval for the two series of intensity measurements (corresponding to the $\lambda_1$ and $\lambda_2$ data array phase measurements) so that the same $\lambda_{FIXED}$ can be used for conversion of each phase measurement from the point detector to surface height.

At a later time, the total phase $\psi_{2i}$ is measured at a second wavelength $\lambda_2$, using detector array 7, circuit 8, and computer 9 in the same fashion, as indicated in block 42. The intensity of light of the interference pattern received at each of the pixels of detector array 7 at points 58-0, 58-1, 58-2, 58-3, and 58-4 on sloped straight line 57 of FIG. 5 is measured. The above-mentioned phase $\psi_{2i}$ then is computed for each pixel in accordance with the phase-shifting algorithm. The spacing between points 58-0, 58-1, and 58-2 of slope 57 corresponds to ninety degree phase shifts at wavelength $\lambda_2$.

The intensity of light received by point detector 11 then is measured beginning at points 59-1, 59-2, 59-3, and 59-4 on sloped straight line 57 in FIG. 5, as indicated in block 42A of FIG. 4. Using these intensities, the phase $\psi_{2FIXED}$ is computed with the same phase shift algorithm as above for $\psi_1$ and $\psi_2$. The spacing between points 59-1, 59-2, 59-3, etc. along the ordinate corresponds to ninety degree phase shifts at $\lambda_{FIXED}$. (In each of the above cases, the same phase shifting algorithm can be used.)

The next step, as indicated in block 43 of FIG. 4A, is to obtain a value of $\Delta h$, the change in height, h being the height of the surface for each pixel of detector array 7 according to the equation $$\Delta h = \frac{\lambda_1}{4\pi} \psi_{1i} - \frac{\lambda_2}{4\pi} \psi_{2i}. \tag{1}$$

$\Delta h$ represents surface height differences if there were no film on the sample. If films are present, they are not simple to interpret, and the purpose for deriving these quantities is to eliminate various parameters so that film thickness t can be obtained.

Next, referring to block 44, a quantity $\delta h$, which represents the relative focus, i.e., the drift, between measurements, is computed according to the equation $$\delta h = \frac{\lambda_{FIXED}}{4\pi} \psi_{2FIXED} - \frac{\lambda_{FIXED}}{4\pi} \psi_{1FIXED}. \tag{2}$$

Then, referring to block 45 of FIG. 4A, a value of $\Delta h$ Corrected For Focus Error and referred to as $\Delta h_{CFFE}$, is computed according to the equation $$\Delta h_{CFFE}(CALIB\ SAMPLE) = \Delta h + \delta h \tag{3}$$

for each pixel.

It should be appreciated that the purpose of the calibration step is to eliminate effects from the reference optics. Most often the effective surface height change is constant across the detector array. That is, it is a single number to be subtracted from subsequent test sample measurements. Also, this step only needs to be performed once for a particular apparatus configuration in order to be applied to a series of test measurements with different film-substrate compositions. It is not necessary to perform the calibration step each time a measurement of a different film-substrate sample is made.

Then, as indicated in block 46, steps similar to those of blocks 40-45 are performed for the test sample 2,3 shown in FIG. 1 to obtain a value of $\Delta h_{CFFE}$(TEST SAMPLE) for each pixel.

Then, as indicated in block 47, a quantity $\Delta h'$ is computed according to the equation $$\Delta h' = \Delta h_{CFFE}(TEST\ SAMPLE) - \Delta h_{CFFE}(CALIB\ SAMPLE) \quad (4)$$

for each pixel.

$\Delta h'$ represents a linear combination of measured phases that happens to be in units of height. Its chief utility is that it is a function only of internal film parameters such as thickness and index of refraction, and not of surface height variation. Ideally, if there were no film, and only dielectric substrate, $\Delta h'$ would be equal to zero.

Next, as indicated in block 48, the procedure requires creation of a "model" of $\Delta h'$ designated by $\Delta h'_{MODEL}$, which is a function of film thickness $t_i$ at the ith pixel of detector array 7, using the equation $$\Delta h'_{MODEL} = \Delta h_i - \Delta h_{CALIB\ SURFACE} \quad (5)$$
$$= \bar{\lambda}_1[\phi(\lambda_1, t_i) - \phi_c(\lambda_1, 0)] - \bar{\lambda}_2[\phi(\lambda_2, t_i) - \phi_c(\lambda_2, 0)],$$

where $\phi$ is the phase change on reflection from the test surface 3B, $\phi_c$ is the phase change on reflection from the calibration surface, $\bar{\lambda}_1$ is equal to $\lambda_1/4\pi$, $\bar{\lambda}_2$ is $\lambda_2/4\pi$, and $t_i$ is the film thickness at the ith pixel. $\phi$ can be computed according to the following formulation: With $N_s = (n_s, k_s)$, the complex refractive index of the substrate material, form Y, a generally complex quantity, using $$Y = N_f \frac{N_s \cos(\beta) + jN_f \sin(\beta)}{N_f \cos(\beta) + jN_s \sin(\beta)}, \quad (6)$$

where $N_f = (n_f, k_f)$ is the complex refractive index of the film material; $\beta = 2\pi N_f t/\lambda$, with t the film thickness, $\lambda$ the wavelength of the measured light, and $j = \sqrt{-1}$. Then $$\phi = \tan^{-1}\left[\frac{-2Imag(Y)}{1 - |Y|^2}\right], \quad (7)$$

where $Imag(Y)$ is the imaginary part of Y, $|Y|$ is the modulus of Y and $\tan^{-1}$ is the arctangent function. (See H. A. Macleod, Thin Film Optical Filters, (MacMillian, N.Y. 1968), Chapter 2.)

Then, as indicated in block 49 of FIG. 4B, computer 9 obtains a value of $t_i$ by comparing $\Delta h'$ for that pixel to the table representing $\Delta h'_{MODEL}$ and selecting a "best fit" value of $t_i$ for each pixel of detector array 7. Then, as indicated in block 50, the surface height profile is computed for that best fit value of $t_i$ in accordance with the equation $$h_s = \frac{\lambda}{4\pi}\psi - \frac{\lambda}{4\pi}\phi(\lambda, t_i) \quad (8)$$

for each pixel, where $\lambda$ can be $\lambda_1$ or $\lambda_2$ and $\psi$ can be $\psi_{1i}$ or $\psi_{2i}$, correspondingly. $\phi$ is a value obtained from equation (7).

Thus, the value of film thickness $t_i$ and the surface profile height $h_s$ has been obtained for every pixel of detector array 7.

Use of a $\lambda_{FIXED}$ filter in front of point detector 11 is optional, and is not always desirable or preferable. Nevertheless, $\lambda_{FIXED}$ is used for the computation of $\delta h$ whether or not a $\lambda_{FIXED}$ filter is present. In either case, $\lambda_{FIXED}$ actually is determined from the traversal of the phase shifter over which the intensities at the point detector are obtained. If a filter is employed, its wavelength should match $\lambda_{FIXED}$ as determined by the phase shifter or an error will result. The phase shifter interval over which the point detector intensities are recorded is necessarily different from the interval used for the data array intensity if $\lambda_1$ and $\lambda_{FIXED}$ or $\lambda_2$ and $\lambda_{FIXED}$ are different. One of these wavelength pairs will have different components since $\lambda_1$ and $\lambda_2$ must be different. While white light is not essential, it is necessary that the same $\lambda$ be present in the illumination at the point detector 11 for each phase measurement in order to compensate for drift error. Having white light illumination provides flexibility and convenience for this purpose.

The operation of the embodiment of FIG. 3 is explained with reference to the flowchart of FIG. 6. This is an important modification of the invention that can be used for a test sample with an exposed substrate area 2A. The first step is to "measure" the total phases $\psi_{1i}$ and $\psi_{2i}$ as indicated in block 70. Then, a linear combination of these values is formed to compute $\Delta h$, according to equation (1) above, as indicated in block 71 of FIG. 6. This is accomplished in a manner entirely similar to that previously described with reference to blocks 41 and 42 of FIG. 4.

Figure 6:
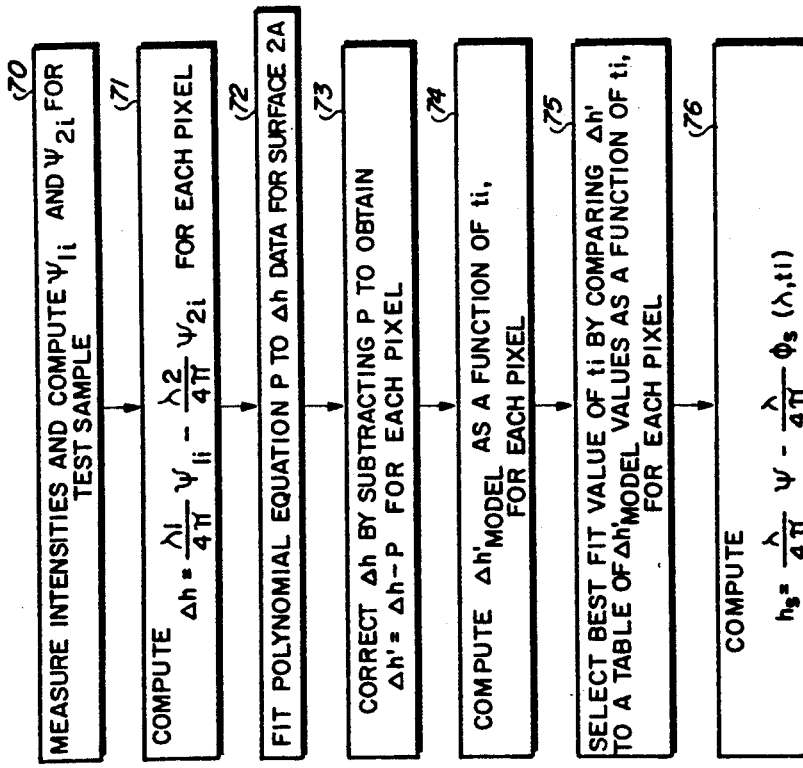
FIG. 6 is a flowchart useful in explaining how to obtain the surface profiles and the film thickness of a film-on-substrate test sample using the embodiment of FIG. 3.

Next, referring to block 72 for the exposed substrate area 2A only, a polynomial equation $P(x,y)$, which equals a fit to $\Delta h$ for the detector array 7 of FIG. 3 corresponding to area 2A only, as indicated in block 72 of FIG. 6. Then, as indicated in block 73, $\Delta h$ is corrected for the film region 3 of FIG. 3 by subtracting the polynomial equation value for each x,y coordinate of the film region 3 to obtain $\Delta h'$. $P(x,y)$ assumes a smooth extrapolation of the fitted data over the unfitted data area (the area covered by the film). The most important term by far is the first term $P_0$, which is a constant that includes $\delta h$.

Then, $\Delta h'_{MODEL}$ is computed as a function of $t_i$ and stored as a table, in a manner entirely similar to that described above with reference to block 48 of FIG. 4A. For this procedure, the theoretical phase change of the substrate surface is used for $\phi_c(\lambda, 0)$. Next, as indicated in block 75, $\Delta h'$ is compared to $\Delta h'_{MODEL}$ to select a best fitting value of $t_i$ at each pixel of film 3. Finally, as indicated in block 76, the corrected surface height profile $h_s$ is computed using equation (6). Thus, the film thickness $t_i$ and the surface profile height $h_s$ has been obtained for every pixel of detector 7.

Figure 7:
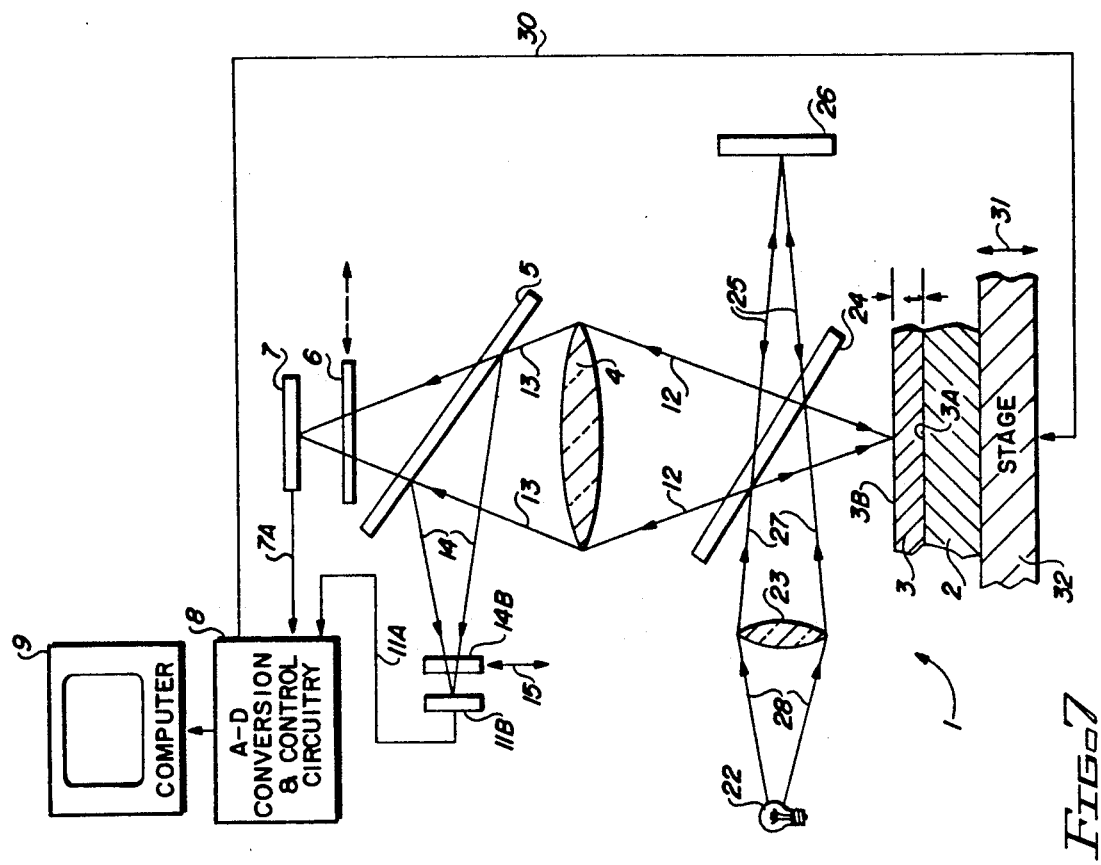
FIG. 7 is a schematic diagram of another embodiment of the invention.

A final embodiment employs a second areal data detector 11B in the position of the point detector of FIG. 1. This new embodiment is shown in FIG. 7. It should be noted that filter 14B is not optional for adequate performance and should pass light at the desired value of $\lambda_2$. This embodiment is important since it allows one to use a single, continuous, total phase-shifting interval to obtain the two required data sets $\psi_{1i}$ and $\psi_{2i}$, and eliminates the need for drift correction. This embodiment retains the novel aspect of the previous embodiments which is a combination of independent filtering of white light between the interferometer and the detectors plus the selection of different phase-shifting sub-intervals for each data set. Although the cost of a second data array is a disadvantage relative to the previous embodiments, the cost for this item and its associated electronics may decrease in the future to the point where this embodiment is preferred over the previous embodiments because all data is acquired over a single, continuous, total phase-shifting time interval.

The first step is to "measure" the total phases $\psi_{1i}$ and $\psi_{2i}$ of a calibration sample as indicated in block 81 of FIG. 8. Note that the phase-shift sub-intervals are chosen for each detector's set of intensities just as they are for the embodiment shown in FIG. 1, only the role of $\lambda_{FIXED}$ is taken by the $\lambda_2$ filter (14B) of FIG. 7. Then, a linear combination of these phase values is formed to compute $\Delta h_{CALIB}$, according to equation (1) above, as indicated in block 82 of FIG. 8.

Next, this procedure is repeated for a test sample and a relative height change $\Delta h'$ is formed according to equation (4) above, as indicated in block 84 of FIG. 8.

Next, $\Delta h'_{MODEL}$ is computed as a function of $t_i$ and stored as a table, in a manner entirely similar to that described above with reference to block 48 of FIG. 4A. For this procedure, the theoretical phase change of the calibration surface is used for $\phi_c(\lambda,0)$. Note that an analogous adaptation of the second embodiment (FIG. 3) for samples with an exposed substrate region is possible, which eliminates the need for a calibration step.

Next, as indicated in block 86 of FIG. 8, $\Delta h'$ is compared to $\Delta h'_{MODEL}$ to select a best fitting $t_i$ at each pixel of film 3. Finally, as indicated in block 87, the corrected surface height profile is computed using equation (6).

It should be appreciated that there are three possible quantities discussed above, including $h_s$, which is the top surface variation, t, which is the film thickness, and h, which is the interfacial surface variation. Only two of these are independent, because they are related by the equation $h = h_s - t$.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the above-described techniques are extendible to samples with more than a single film layer on a substrate by adding measurements at more than two wavelengths and using the $\Delta h$'s from independent wavelength pairs to find the various thicknesses of the various layers. More importantly, measurements of $\psi$ at more than two wavelengths can be used for the single-layer samples to resolve possible phase ambiguities that sometimes occur by analyzing $\Delta h'$ from the various independent wavelength pairs and comparing the values of t obtained from each pair. While point detector 11 has been described as detecting intensities at a single point of a test surface, it actually is only necessary that intensities be detected in a single small area of the interference pattern. The calibration surface referred to ordinarily only needs to be measured once for a particular optical setup, and need not be measured at all if the user can provide reference data that accurately represents the parameters of the optical system.

What is claimed is:

1. A method for simultaneously measuring both the relative height and the thickness of a film of an object that includes the film on a substrate, the method comprising the steps of:

(a) producing a first interference pattern between a test beam reflected from a calibration surface and a reference beam reflected from a reference surface of an interferometer operating at a first wavelength;

(b) detecting the first interference pattern with a detector array, measuring a plurality of intensities of the first interference pattern, and computing a first group of phase values corresponding to the first wavelength for each pixel of the detector array by means of a preselected phase shifting algorithm;

(c) detecting a first intensity value corresponding to a point of the calibration surface with a point detector and computing a corresponding phase value by means of the preselected phase shifting algorithm;

(d) producing a second interference pattern between a test beam reflected from the calibration surface and a reference beam reflected from the reference surface of the interferometer operating at a second wavelength;

(e) detecting the second interference pattern with the detector array and measuring intensities of the interference pattern and computing a second group of phase values corresponding to the second wavelength for the calibration surface for each pixel of the detector array by means of the preselected phase shifting algorithm;

(f) detecting a second intensity value of a point of the calibration surface with the point detector and computing a corresponding phase value by means of the preselected phase shifting algorithm;

(g) computing a value of effective surface height change by, in effect, obtaining the difference between the corresponding phase values of the first and second groups for each pixel of the detector array;

(h) computing a drift value by obtaining a difference between the second and first phase values from the point detector;

(i) computing a corrected surface height change value for the calibration surface by adding the value of the effective surface height change $\Delta h$ to the drift value for the calibration surface;

(j) repeating steps (a) through (i) for a test surface instead of the calibration surface to obtain corrected surface height change value;

(k) computing a corrected relative surface height change value by subtracting the corrected surface height change value for the calibration surface from the corrected surface height change value for the test surface for each pixel;

(l) computing a list of relative surface height change values as a function of film thickness;

(m) comparing computed effective surface height change values to corresponding values from the list to obtain a best fit value of film thickness for each pixel;

(n) computing relative surface height variation of the test surface by subtracting the phase change on reflection due to the film at the best fit value of film thickness.

2. The method of claim 1 wherein steps (c) and (f) include illuminating the point detector with broadband light of the first and second interference patterns, respectively.

3. The method of claim 2 wherein steps (c) and (f) include filtering the broadband light with a filter having a passband at wavelength $\lambda_{FIXED}$.

4. The method of claim 2 wherein step (h) includes computing the drift value according to the equation $$\delta h = \frac{\lambda_{FIXED}}{4\pi} \psi_{2FIXED} - \frac{\lambda_{FIXED}}{4\pi} \psi_{1FIXED},$$

wherein $\lambda_{FIXED}$ is determined by selecting a phase shift at which the intensity values for the point detector are detected in step (e) or step (f) that corresponds to $\lambda_{FIXED}$.

5. The method of claim 4 wherein step (g) includes computing the effective surface height change value according to the equation $$\Delta h = \frac{\lambda_1}{4\pi} \psi_{1i} - \frac{\lambda_2}{4\pi} \psi_{2i},$$

where $\psi_{1i}$ and $\psi_{2i}$ are the phase values computed in steps (b) and (e).

6. The method of claim 5 wherein step (k) includes computing the corrected relative surface height change value according to the equation $$\Delta h' = \Delta h_{CFFE}(TEST\ SAMPLE) - \Delta h_{CFFE}(CALIB\ SAMPLE)$$

for each pixel.

7. The method of claim 6 wherein step (l) includes computing the list according to the equation $$\Delta h'_{MODEL} = \Delta h_i - \Delta h_{CALIB\ SURFACE}$$
$$= \bar{\lambda}_1[\phi(\lambda_1, t) - \phi_c(\lambda_1, 0)] - \bar{\lambda}_2[\phi(\lambda_2, t) - \phi_c(\lambda_2, 0)],$$

for a range of likely t values, where $\phi$ is the modelled phase change on reflection from the test surface, $\phi_c$ is the phase change on reflection of the calibration surface, $$\bar{\lambda}_1 \text{ is equal to } \frac{\lambda_1}{4\pi}, \bar{\lambda}_2 \text{ is } \frac{\lambda_2}{4\pi},$$

and t is a film thickness variable.

8. A method for simultaneously measuring both the relative height and the thickness of a film of an object that includes the film on a substrate, the method comprising the steps of:

(a) producing a first interference pattern between a test beam reflected from a test surface of the film and an exposed portion of the substrate and a reference beam reflected from a reference surface of an interferometer operating at a first wavelength;

(b) detecting the first interference pattern with a detector array, measuring a plurality of intensities of the first interference pattern, and computing a first group of phase values corresponding to the first wavelength for each pixel of the detector array in accordance with a preselected phase shifting algorithm;

(c) producing a second interference pattern between a test beam reflected from the test surface and the exposed portion of the substrate and a reference beam reflected from the reference surface of the interferometer operating at a second wavelength;

(d) detecting the second interference pattern with the detector array and measuring intensities of the interference pattern and computing a second group of phase values corresponding to the second wavelength for each pixel of the detector array in accordance with the preselected phase shifting algorithm;

(e) computing values of surface height change by effectively obtaining the difference between the corresponding phase values of the first and second groups for each pixel, respectively;

(f) obtaining drift values by fitting a polynomial equation to the surface height change values for the exposed portion of the substrate;

(g) computing a corrected relative surface height change value of the test surface by subtracting the change value of the polynomial equation from the surface height change value for the test surface for each pixel;

(h) computing a table of surface height change values as a function of film thickness;

(i) comparing computed surface height change values to corresponding values from the table to obtain a best fit value of film thickness for each pixel;

(j) computing relative surface height of the test sample by subtracting the phase changes on reflection due to the film at the best fit value of film thickness from the phase values of either the first or second group.

9. The method of claim 8 wherein step (e) includes computing the effective surface height change value according to the equation $$\Delta h = \frac{\lambda_1}{4\pi} \psi_{1i} - \frac{\lambda_2}{4\pi} \psi_{2i},$$

for each pixel i, where $\psi_{1i}$ and $\psi_{2i}$ are the phase values computed in steps (b) and (d).

10. The method of claim 9 including fitting a polynomial to the values of $\Delta h$ over the exposed substrate area, and then computing a corrected value of effective surface height change according to the equation $$\Delta h' = \Delta h - P$$

for each pixel, where P is the value of the polynomial at that pixel.

11. The method of claim 10 wherein step (h) includes computing the list according to the equation $$\Delta h'_{MODEL} = \Delta h_i - \Delta h_{SUBSTRATE}$$
$$= \bar{\lambda}_1[\phi(\lambda_1, t) - \phi_c(\lambda_1, 0)] - \bar{\lambda}_2[\phi(\lambda_2, t) - \phi_c(\lambda_2, 0)],$$

for a range of likely t values, where $\phi$ is the modeled phase change on reflection from the test surface, $\phi_c$ is the phase change from the exposed substrate, $\overline{\lambda}_1$ is equal to $\frac{\lambda_1}{4\pi}$, $\overline{\lambda}_2$ is $\frac{\lambda_2}{4\pi}$, and t is a film thickness variable.

12. A device for simultaneously measuring both the relative height and the thickness of a film of an object that includes the film on a substrate the device comprising in combination:
(a) an interferometer;
(b) means for producing first and second interference patterns between a test beam reflected from a calibration surface or a test surface and a reference beam reflected from a reference surface of the interferometer operating at first and second wavelengths, respectively;
(c) means for detecting the first and second interference patterns with a detector array;
(d) means for measuring a plurality of intensities of the first and second interference patterns; and
(e) means for computing a first and a second group of phase values corresponding to the first and second wavelengths, respectively, for each pixel of the detector array by means of a preselected phase shifting algorithm;
(f) means for detecting first and second intensity values corresponding to a small area point of the calibration surface with a point detector and computing corresponding phase values by means of the preselected phase shifting algorithm;
(g) means for computing a value of effective surface height change by, in effect, obtaining the difference between the corresponding phase values of the first and second groups for each pixel;
(h) means for computing a drift value by obtaining a difference between the first and second phase values;
(i) means for computing a corrected surface height change value for the calibration surface and a corrected surface height change value for the test surface by adding the value of the surface height change $\Delta h$ to the drift value for the calibration surface and the test surface, respectively;
(j) means for computing a corrected relative surface height change value by subtracting the corrected surface height change value for the calibration surface from the corrected surface height change value for the test surface for each pixel;
(k) means for computing a list of relative surface height changes values as a function of film thickness;
(l) means for comparing computed effective surface height change values to corresponding values from the list to obtain a best fit value of film thickness for each pixel; and
(m) means for computing relative surface height variation of the test sample by subtracting the phase change on reflection due to the film at a best fit value of film thickness.

13. The device of claim 12 including means for illuminating the point detector with broadband light of the first and second interference patterns, respectively.

14. The device of claim 13 including a filter having a passband at wavelength $\lambda_{FIXED}$ positioned to filter the broadband light.

15. The device of claim 13 including means for computing a drift value according to the equation $$\delta h = \frac{\lambda_{FIXED}}{4\pi}\psi_{2FIXED} - \frac{\lambda_{FIXED}}{4\pi}\psi_{1FIXED},$$

wherein $\lambda_{FIXED}$ is determined by selecting a phase shift at which the first intensity value is detected in step (e) or step (f) that corresponds to $\lambda_{FIXED}$.

16. The device of claim 15 including means for computing the effective surface height change according to the equation $$\Delta h = \frac{\lambda_1}{4\pi}\psi_{1i} - \frac{\lambda_2}{4\pi}\psi_{2i}.$$

17. The device of claim 16 including means for computing the corrected relative surface height change value according to the equation $$\Delta h' = \Delta h_{CFFE}(TEST\ SAMPLE) - \Delta h_{CFFE}(CALIB\ SAMPLE)$$

for each pixel.

18. The device of claim 17 including means for computing the list according to the equation $$\Delta h'_{MODEL} = \Delta h_i - \Delta h_{CALIB\ SURFACE}$$
$$= \overline{\lambda}_1[\phi(\lambda_1, t) - \phi(\lambda_1, 0)] - \overline{\lambda}_2[\phi_c(\lambda_2, t) - \phi_c(\lambda_2, 0)],$$

for a range of likely t values, where $\phi$ is the phase change on reflection from the test surface, $\phi_c$ is the phase change from the calibration surface, $\overline{\lambda}_1$ is equal to $\frac{\lambda_1}{4\pi}$, $\overline{\lambda}_2$ is $\frac{\lambda_2}{4\pi}$, and t is the thickness of the film corresponding to an ith pixel of the detector array.

19. A device for simultaneously measuring both the relative surface height and the thickness of a film of an object that includes the film on a substrate, the device comprising in combination:
(a) an interferometer;
(b) means for producing first and second interference patterns between a test beam reflected from a test surface of the film and an exposed portion of the substrate and a reference beam reflected from a reference surface of the interferometer operating at a first and a second wavelength, respectively;
(c) means for detecting the first interference pattern with a detector array;
(d) means for measuring a plurality of intensities of the first interference pattern;
(e) means for computing first and second groups of phase values corresponding to the first and second wavelengths for each pixel of the detector array in accordance with a preselected phase shifting algorithm;
(f) means for computing values of surface height change by effectively obtaining the difference between the corresponding phase values of the first and second groups for each pixel, respectively;
(g) means for obtaining drift values by fitting a polynomial equation to the surface height change values over the exposed substrate area;
(h) means for computing a corrected relative surface height change value by subtracting the change value of the polynomial equation from the surface height change value for the test surface for each pixel;

(i) means for computing a table of surface height change values as a function of film thickness;

(j) means for comparing computed surface height change values to corresponding values from the table to obtain a best fit value of film thickness for each pixel; and (k) means for computing relative surface height of the test sample by subtracting the phase changes on reflection due to the film at the best fit value of film thickness from the phase values of either the first or second group.

20. The device of claim 19 including means for computing the effective surface height change according to the equation $$\Delta h = \frac{\lambda_1}{4\pi} \psi_{1i} - \frac{\lambda_2}{4\pi} \psi_{2i},$$

for each pixel i.

21. The device of claim 20 including means for fitting a polynomial to the values of $\Delta h$, for the exposed portion of the substrate, and means for computing a corrected value of effective surface height change according to the equation $$\Delta h' = \Delta h - P$$

for each pixel, where P is the value of the polynomial at that pixel.

22. The device of claim 21 including means for computing the list according to the equation $$\Delta h'_{MODEL} = \Delta h_i - \Delta h_{SUBSTRATE}$$
$$= \overline{\lambda}_1[\phi(\lambda_1, t) - \phi_c(\lambda_1, 0)] - \overline{\lambda}_2[\phi(\lambda_2, t) - \phi_c(\lambda_2, 0)],$$

for each pixel of the detector array, where $\phi$ is the phase change on reflection from the test surface, $\phi_c$ is a modeled phase change from the exposed substrate, $$\overline{\lambda}_1 \text{ is equal to } \frac{\lambda_1}{4\pi}, \overline{\lambda}_2 \text{ is } \frac{\lambda_2}{4\pi},$$

and t is the thickness of the film corresponding to an ith pixel of the detector array.

23. A method for simultaneously measuring both the relative height and the thickness of a film of an object that includes the film on a substrate, the method comprising the steps of:

(a) producing a first interference pattern between a test beam reflected from a test surface and a reference beam reflected from a reference surface of an interferometer operating at a first wavelength;

(b) detecting the first interference pattern with a detector array, measuring a plurality of intensities of the first interference pattern, and computing a first group of phase values corresponding to the first wavelength for each pixel of the detector array by means of a preselected phase shifting algorithm;

(c) detecting a first intensity value corresponding to a point of the test surface with a point detector and computing a corresponding phase value by means of the preselected phase shifting algorithm;

(d) producing a second interference pattern between a test beam reflected from the test surface and a reference beam reflected from the reference surface of the interferometer operating at a second wavelength;

(e) detecting the second interference pattern with the detector array and measuring intensities of the interference pattern and computing a second group of phase values corresponding to the second wavelength for the test surface for each pixel of the detector array by means of the preselected phase shifting algorithm;

(f) detecting a second intensity value of a point of the test surface with the point detector and computing a corresponding phase value by means of the preselected phase shifting algorithm;

(g) computing a value of effective surface height change by, in effect, obtaining the difference between the corresponding phase values of the first and second groups for each pixel of the detector array;

(h) computing a drift value by obtaining a difference between the second and first phase values from the point detector;

(i) computing a corrected surface height change value for the test surface by adding the value of the effective surface height change to the drift for the test surface;

(j) computing a list of relative surface height changes values as a function of film thickness;

(k) comparing computed effective surface height change values to corresponding values from the list to obtain a best fit value of film thickness for each pixel;

(l) computing relative surface height variation of the test surface by subtracting the phase change on reflection due to the film at the best fit value of film thickness.

24. The method of claim 23 wherein steps (a) through (i) are performed for a calibration surface, rather than a test surface, of known phase change prior to subsequent measurements of test surfaces to obtain a corrected surface height change value for the calibration surface.

25. The method of claim 24 including computing a corrected relative surface height change value by subtracting the corrected surface height change value for the calibration surface from the corrected surface height change for the test surface.

26. A method for simultaneously measuring both the relative height and the thickness of a film on a substrate, the method comprising the steps of:

(a) producing a first interference pattern between a reference beam and a test beam reflected from a test surface at a first wavelength;

(b) detecting the first interference pattern with a first detector, and computing a first group of phase values corresponding to the first wavelength for each element of the first detector;

(c) detecting a first intensity value corresponding to a point of the test surface with a second detector and computing a corresponding phase value;

(d) producing a second interference pattern between a reference beam and a test beam reflected from the test surface at a second wavelength;

(e) detecting the second interference pattern with the first detector and computing a second group of phase values corresponding to the second wavelength for each element of the first detector array;

(f) detecting a second intensity value of a point of the test surface with the second detector and computing a corresponding phase value;

(g) computing a value of effective surface height change by a linear combination of the corresponding phase values of the first and second groups for each element of the first detector;

(h) computing a drift value by a linear combination of the second and first phase values from the second detector;

(i) computing a corrected surface height change value for the test surface by adding the value of the effective surface height change to the drift;

(j) computing a list of effective surface height change values as a function of film thickness;

(k) comparing computed effective surface height change values computed from the first and second interference pattern to corresponding values from the list to obtain a best fit value of film thickness for each element of the first detector;

(l) computing relative surface height variation of the test surface by subtracting the contribution due to the phase change on reflection due to the film at the best fit value of film thickness.

27. The method of claim 26 including, after step (g), subtracting from the value of effective surface height change a reference number that characterizes the optical system from the corrected surface height change value for the test surface for each pixel.

28. A method for simultaneously measuring both the relative height and the thickness of a film of an object that includes the film on a substrate, the method comprising the steps of:

(a) producing first and second interference patterns between a test beam reflected from a calibration surface and a reference beam reflected from a reference surface of an interferometer operating in broadband light;

(b) detecting the two interference patterns simultaneously with two detector arrays, measuring respective pluralities of intensities, and computing two groups of phase values for each pixel of each array corresponding to the wavelengths selected for each array by means of preselected phase shifting algorithms;

(c) computing a value of effective surface height change by, in effect, obtaining the difference between the corresponding phase values of the first and second groups for the corresponding pixels of the two detector arrays;

(d) repeating steps (a) through (c) for a test sample instead of the calibration surface to obtain an effective surface height change value for the test sample;

(e) computing a relative surface height change value by subtracting the effective surface height change value for the calibration surface from the corrected surface height change value for the test sample for each pixel;

(f) computing a list of relative surface height change values as a function of film thickness;

(g) comparing the computed relative surface height change value obtained from measurement to a corresponding value from the computed list to obtain a best fit value of film thickness for each pixel;

(h) computing relative surface height variation of the test surface by subtracting the error due to phase change on reflection from the film at the best fit value of film thickness for each pixel.

29. The method of claim 28 wherein step (b) includes filtering the broadband light illuminating the two detectors with filters having passbands at wavelengths $\lambda_1$ and $\lambda_2$, respectively.

30. The method of claim 29 wherein steps (c) and (d) includes computing the effective surface height changes according to the equation $$\Delta h_i = \frac{\lambda_1}{4\pi} \psi_{1i} - \frac{\lambda_2}{4\pi} \psi_{2i}$$

where $\psi_{1i}$ and $\psi_{2i}$ are the phase values computed in step (b).

31. The method of claim 30 wherein step (e) includes computing the relative surface height change value according to the equation $$\Delta h' = \Delta h(TEST\ SAMPLE) - \Delta h(CALIB\ SAMPLE)$$

for each pixel.

32. The method of claim 31 wherein step (f) includes computing the list according to the equation $$\Delta h'_{MODEL} = \Delta h(t_i) - \Delta h_{CALIB}$$
$$= \bar{\lambda}_1[\phi(\lambda_1, t) - \phi_c(\lambda_1, 0)] - \bar{\lambda}_2[\phi(\lambda_2, t) - \phi_c(\lambda_2, 0)],$$

for a range of likely t values, where $\phi$ is the modeled phase change on reflection from the test surface, $\phi_c$ is the phase change of reflection from the calibration surface, $\bar{\lambda}_1$ is equal to $\lambda_1/(4\pi)$, $\bar{\lambda}_2$ is equal to $\lambda_2/(4\pi)$, and t is a possible film thickness.

33. A method for simultaneously measuring both the relative height and the thickness of a film on a substrate, the method comprising the steps of:

(a) producing two or more interference patterns between a reference beam and a test beam reflected from a test surface;

(b) detecting each interference pattern with a separate detector, and computing groups of phase values corresponding each distinct wavelength associated with the data from each detector;

(c) computing values of effective surface height changes from linear combinations of all independent pairs of phase values for each area of the sample associated with corresponding elements on the data arrays;

(d) computing lists of effective surface height change values as functions of film thickness;

(e) comparing computed effective surface height change values computed from independent pairs of interference patterns to the corresponding values from the lists to obtain a best fit value of film thickness for each area of the sample associated with the corresponding element from each detector;

(f) computing the relative surface height variation of the test surface by subtracting error due to the phase change on reflection from the film at the best fit value of film thickness from the uncorrected surface height.

34. The method of claim 33 wherein step (b) includes filtering the broadband light illuminating the detectors with filters having passbands at wavelengths $\lambda_1, \lambda_2, \ldots \lambda_n$.

35. The method of claim 34 wherein step (c) includes computing the independent effective surface height changes according to the equation $$\Delta h_{1m} = \frac{\lambda_1}{4\pi} \psi_{1i} - \frac{\lambda_m}{4\pi} \psi_{mi}$$

wherein $\psi_{1i}$ and $\psi_{mi}$ are the phase values computed in step (b) from the data of detectors 1 and m, with m running from 2 to n, the number of detectors, the index i indicating that the calculation is for an ith area of the sample.

36. The method of claim 35 wherein step (d) includes computing several lists according to the equation $$\Delta h_m(t) = \overline{\lambda}_1 \phi(\lambda_1, t) - \overline{\lambda}_m \phi(\lambda_m, t),$$

for a range of likely t values, where $\phi$ is the modeled phase change on reflection from the test surface, $\overline{\lambda}_1$ is equal to $\lambda_1/(4\pi)$, $\overline{\lambda}_m$ is equal to $\lambda_m/(4\pi)$, and t is a possible film thickness.

37. The method of claim 36 wherein step (f) includes computing the relative surface height variation according to the equation $$h_s = \overline{\lambda}_m[\psi_{mi} - \phi(\lambda_m, t_i)]$$

at each sample element i, where $\phi$ is the modeled phase change on reflection from the test sample for film thickness $t_i$, $\overline{\lambda}_m$ is equal to $\lambda_m/(4\pi)$, $\psi_{mi}$ is the phase computed from the data set of the $m^{th}$ detector, and $t_i$ is a best fit value for film thickness found from the comparison of one or more effective height changes with its corresponding list.

38. The method of claim 33 including, after step (c), subtracting from the values of effective surface height change reference numbers that characterize the optical system resulting in relative surface height change values for the test sample for each sample area element.

39. A method for simultaneously measuring both the relative height and the thickness of a film of an object that includes the film on a substrate, the method comprising the steps of:
(a) producing first and second interference patterns between a test beam reflected from a test surface of the film and an exposed portion of the substrate and a reference beam reflected from a reference surface of an interferometer operating in broadband light;
(b) detecting the two interference patterns simultaneously with two detector arrays, measuring respective pluralities of intensities, and computing two groups of phase values for each pixel of each array corresponding to the wavelengths selected for each array by means of a preselected phase shifting algorithm;
(c) computing a value of effective surface height change by, in effect, obtaining the difference between the corresponding phase values of the first and second groups for the corresponding pixels of the two detector arrays;
(d) fitting a polynomial equation to the effective surface height change values for the exposed portion of the substrate in order to compensate for unknown phase changes of the interferometer system which influence the interference patterns;
(e) computing a corrected surface height change value of the test surface by subtracting a change value of the polynomial equation from the effective surface height change value for the test surface at each pixel;
(f) computing a list of relative surface height change values as a function of film thickness;
(g) comparing computed effective surface height change values to corresponding values from the list to obtain a best fit value of film thickness for each pixel;
(h) computing relative surface height variation of the test surface by subtracting error due to phase change on reflection from the film at the best fit value of film thickness for each pixel.

40. The method of claim 39 wherein step (c) includes computing the effective surface height change according to the equation $$\Delta h = \frac{\lambda_1}{4\pi} \psi_{1i} - \frac{\lambda_2}{4\pi} \psi_{2i},$$

for each pixel i, where $\psi_{1i}$ and $\psi_{2i}$ are the phase values computed in step (b).

41. The method of claim 40 including fitting a polynomial to the values of $\Delta h$, for the exposed portion of the substrate, and then computing a corrected value of effective surface height change according to the equation $$\Delta h' = \Delta h - P$$

for each pixel, where P is the value of the polynomial at that pixel.

42. The method of claim 41 wherein step (f) includes computing the list according to the equation $$\Delta h'_{MODEL} = \Delta h_i - \Delta h_{SUBSTRATE}$$
$$= \overline{\lambda}_1[\phi(\lambda_1, t) - \phi_c(\lambda_1, 0)] - \overline{\lambda}_2[\phi(\lambda_2, t) - \phi_c(\lambda_2, 0)],$$

for a range of likely t values, where $\phi_c$ is the modeled phase change on reflection from the test surface, $\phi_c$ is the phase change from the exposed substrate, $$\overline{\lambda}_1 \text{ is equal to } \frac{\lambda_1}{4\pi}, \overline{\lambda}_2 \text{ is } \frac{\lambda_2}{4\pi},$$

and t is a film thickness variable.

* * * * *